M. T. PRITCHARD.
BEE SHIPPING PACKAGE.
APPLICATION FILED APR. 18, 1918.

1,361,404.

Patented Dec. 7, 1920.
2 SHEETS—SHEET 1.

Inventor
Mell T. Pritchard
by Chas. J. Williamson
atty.

M. T. PRITCHARD.
BEE SHIPPING PACKAGE.
APPLICATION FILED APR. 18, 1918.
1,361,404.
Patented Dec. 7, 1920.
2 SHEETS—SHEET 2.
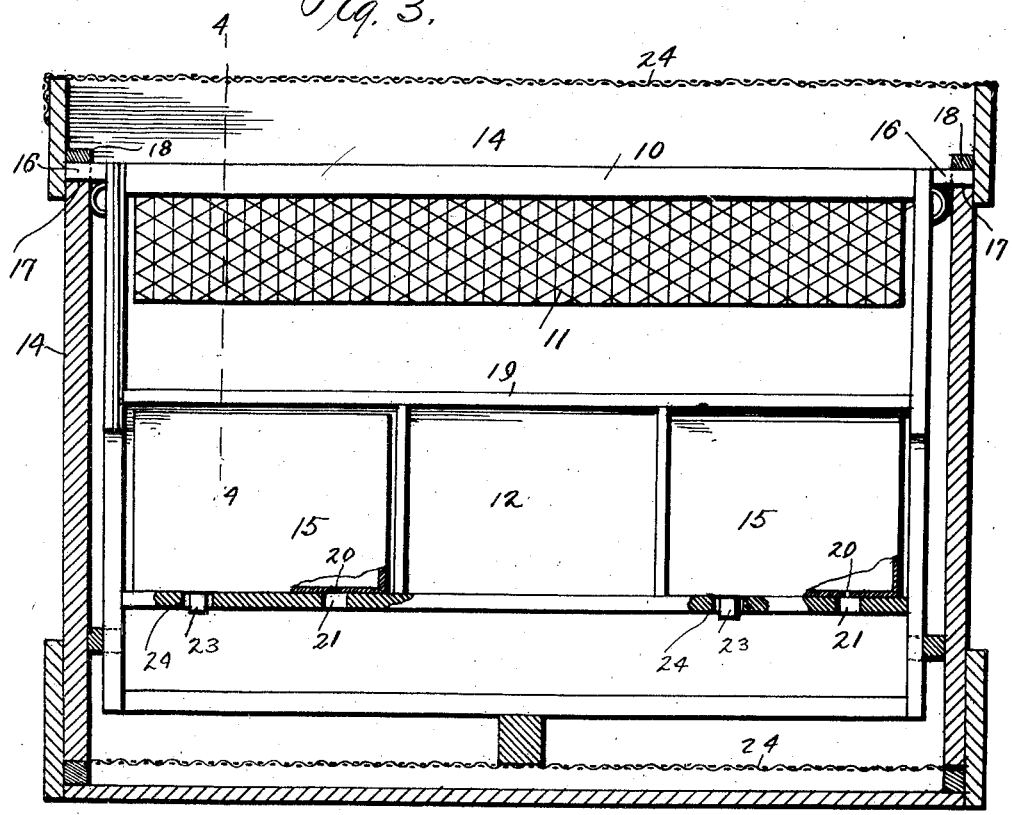
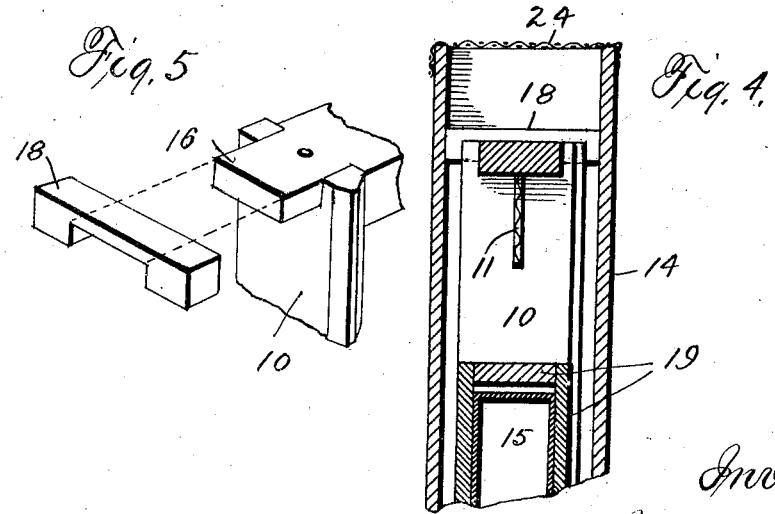
Inventor
Mell T. Pritchard
by Chas. Williamson
Atty

UNITED STATES PATENT OFFICE.

MELL T. PRITCHARD, OF MEDINA, OHIO.

BEE-SHIPPING PACKAGE.

1,361,404.   Specification of Letters Patent.   Patented Dec. 7, 1920.

Application filed April 18, 1918. Serial No. 229,429.

*To all whom it may concern:*

Be it known that I, MELL T. PRITCHARD, of Medina, in the county of Medina and State of Ohio, have invented a certain new and useful Improvement in Bee-Shipping Packages, and do hereby declare that the following is a full, clear, and exact description thereof.

According to the practice in shipping bees with which I am familiar, a large percentage of the bees shipped die *en route*, sometimes as much as fifty per cent., and bee diseases such as foul brood are carried throughout the country. The object of my invention is to overcome these two very serious evils and to deliver the bees at their destination with the danger of loss reduced to a minimum, and in a healthy condition, and without the transmission with them of disease germs. Other objects and advantages of my invention will appear from the description hereinafter given. For attaining my objects, my invention consists in a bee shipping box or package having the characteristics of construction and relative arrangement of parts substantially as hereinafter specified and set forth in the claims.

In the accompanying drawings:

Fig. 3 is a vertical longitudinal section on the line 3—3 of Fig. 1;

Fig. 4 is a cross section on the line 4—4 of Fig. 3.

Fig. 5 is a detail view in perspective of the brood-frame securing device.

Figure 1:
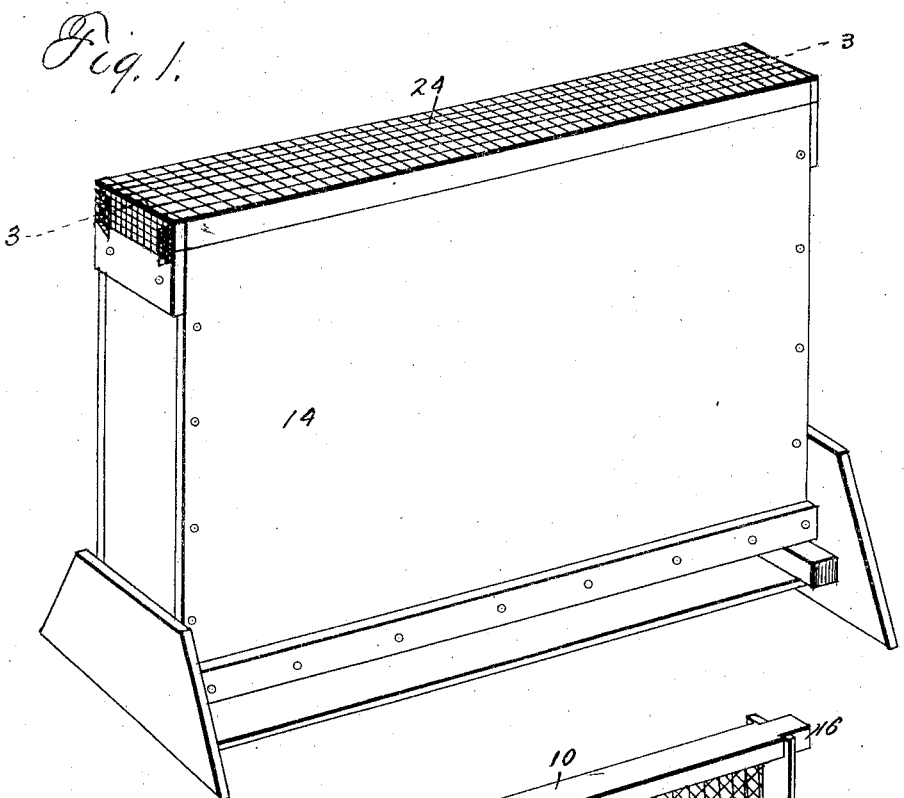
Figure 1 is a perspective view of a bee shipping box showing its external appearance when ready for shipment.
Figure 2:
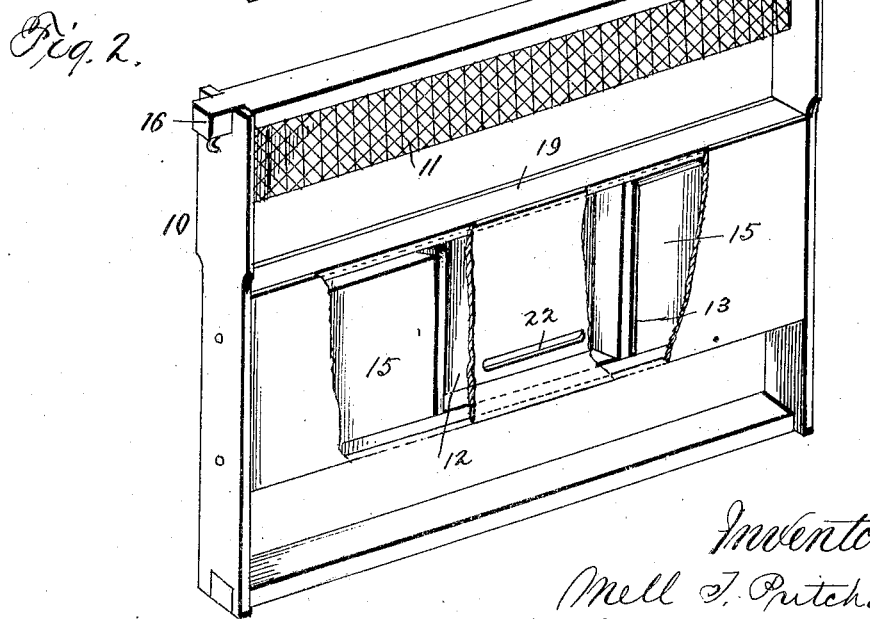
Fig. 2 is a similar view of the brood frame and its associated members or elements removed from the external casing or inclosure.

Briefly described my invention utilizes an ordinary brood frame 10 such as can be put in a hive and serve therein all the purposes of an ordinary brood frame, and which is provided with a strip of comb foundation 11 depending from the top bar, a container 12 for bee food in the form of candy, and a container 13 for water, and a suitable external casing or inclosure 14 which confines the bees within the brood frame and protects the latter and its contents from injury during shipment, and by which the brood frame is properly suspended or supported.

The brood frame shown in the drawings is of a well known construction comprising parallel top and bottom bars and parallel end bars from which the top bar projects forming at each end a lug 16 by which within the hive, the brood frame is supported or suspended and which rests upon ledges or shoulders 17 at the ends of the inclosing casing 14 of the shipping case so that when in the latter, the brood frame is suspended or supported in a similar manner as when in the hive, and a cross block 18 inserted through the top of the casing and engaging the upper side of each lug securely holding the brood frame in place while permitting its ready removal, as when it reaches its destination, it being necessary merely to remove the holding blocks and then lift out the brood frame with its bee and other contents. When this has been done it is then necessary merely to remove the food and water containers and at once the bees in the frame can be placed in a hive.

A convenient way of supporting the food and water is shown in the drawings, it comprising a box like frame 19 composed of top, bottom, end and side walls having a length snugly to fit between the end bars of the brood frame and a height considerably less than the distance between the top and bottom bars of the brood frame so that when mounted in the brood frame (by means permitting its ready removal) a substantial space will be left above and below the same. As shown said box is divided into several rectangular compartments by vertical partitions in each of two of which is placed a sheet metal box 15 that loosely fills its compartment one of which contains water and is the water container, and the other of which contains syrup, while the third compartment forms the container 12 for soft candy, and provision is made for the ready access of the bees to the contents of each of these containers. In the case of each of the metal boxes or bottles, a small hole or perforation 20 is made in its bottom wall and immediately below such perforation a considerably larger hole 21 is provided in the bottom bar of the frame 19 through which the bees have access to the perforation 20 and thus to the contents of each of said metallic containers; and in the case of the soft candy container, a horizontal slot 22 is cut through one of the side walls of the frame 19 through which the bees can have access to the food within. Each of the metal containers has a filling hole which is closed by a cork or stopper 23 to accommodate a suitable hole 24 which is provided in the bottom bar of the frame 19.

To provide for ample ventilation, while preventing the escape of the bees, the top and bottom of the outside casing 14 are respectively closed by strips of wire netting 24 or other foraminous or perforated material. The upper strip is readily removable to give access to the casing 14.

A portion of the food which bees eat is intended for conversion by them into beeswax for the building of their combs, and it is for that reason that I provide the foundation strip and the working space in the brood frame 10 because in transit the bees will utilize the extra food in converting the same into beeswax and building combs and thus in shipment they live under conditions approximating normal conditions. In the absence of means to utilize the food beyond that required for their sustenance they become congested and that is one explanation of the high mortality rate in the shipping of bees. That cause of loss is therefore avoided by supplying as I do the conditions under which they can work and utilize surplus food *en route*, and when they arrive at their destination they are in better condition because of their ability to conform to normal conditions while *en route*. Since brood cells may be built up during transit, the queen can lay eggs during transit.

I do not provide either brood comb or comb containing sealed honey both of which are dangerous to ship because in them are contained the germs of bee disease and particularly foul brood, and yet I provide all necessary supplies of food and water and for working conditions so that the danger of spreading bee disease by the shipment of brood comb and comb honey is eliminated, and it is possible for the bees to arrive at their destination with a minimum of loss and in a healthy condition, and so that they can be at once placed in the hive, and the brood frame in which they have been transported utilized therein with whatever work in comb building and egg laying that has been done *en route* utilized.

I have described with some particularity many of the details of construction and arrangement of parts, but it will, of course, be understood that in its broadest aspect my invention is not limited to details, but many changes in construction and relative arrangement of parts may be made without departing from the scope of my invention in its broadest aspect.

Having thus described my invention what I claim is:

1. A bee shipping package comprising a brood frame and a protecting inclosure, the brood frame having comb foundation, and means within the inclosure for supplying food to the bees.

2. A bee shipping package comprising a brood frame and a protecting inclosure, the brood frame having comb foundation, and means within the inclosure for supplying food and water to the bees.

3. A bee shipping package comprising a brood frame, a protecting inclosure, and means within such inclosure for supplying food to the bees, said means being removably attached to the brood frame.

4. A bee shipping package comprising a brood frame, a protecting inclosure, and means within such inclosure for supplying food and water to the bees, said means being removably attached to the brood frame.

5. A bee shipping package comprising a brood frame and a protecting inclosure, the brood frame having comb foundation, and means for supplying food and water removably attached to the brood frame.

6. A bee shipping package comprising a brood frame and a protecting inclosure, the brood frame having comb foundation, and a support divided into several compartments removably attached to the end walls of the brood frame spaced below the comb foundation and above the bottom bar of the brood frame.

7. A bee shipping package comprising a brood frame, a protecting inclosure, and means within such inclosure for supplying food to the bees, said inclosure having ventilating openings.

In testimony that I claim the foregoing I have hereunto set my hand.

MELL T. PRITCHARD.